(12) United States Patent
Cassone et al.

(10) Patent No.: US 7,676,490 B1
(45) Date of Patent: Mar. 9, 2010

(54) PROJECT PREDICTOR

(75) Inventors: Deandra T. Cassone, Overland Park, KS (US); Joseph E. Dudley, Overland Park, KS (US); George R. Kather, Leavenworth, KS (US); Paul R. Sapenaro, Overland Park, KS (US); Jason N. Ward, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 184 days.

(21) Appl. No.: 11/467,226

(22) Filed: Aug. 25, 2006

(51) Int. Cl.
*G06F 17/00* (2006.01)
*G06F 15/16* (2006.01)
(52) U.S. Cl. .................. 707/102; 707/104.1; 705/7; 705/10; 705/37
(58) Field of Classification Search .......... 707/104.1, 707/102; 705/10, 7, 37
See application file for complete search history.

(56) References Cited

U.S. PATENT DOCUMENTS

| | | | | |
|---|---|---|---|---|
| 5,189,606 | A * | 2/1993 | Burns et al. | 705/10 |
| 5,736,596 | A * | 4/1998 | Heitz et al. | 524/90 |
| 5,798,950 | A * | 8/1998 | Fitzgerald | 703/17 |
| 5,815,638 | A * | 9/1998 | Lenz et al. | 706/15 |
| 5,918,219 | A * | 6/1999 | Isherwood | 705/37 |
| 2004/0054568 | A1* | 3/2004 | Bradley et al. | 705/7 |
| 2004/0249779 | A1* | 12/2004 | Nauck et al. | 706/47 |
| 2005/0065826 | A1* | 3/2005 | Baker et al. | 705/7 |
| 2006/0044307 | A1* | 3/2006 | Song | 345/419 |

OTHER PUBLICATIONS

Lionel C. Briand, Bernd Freimut, Ferdinand Vollei; "Using multiple adaptive regression splines to support decision making in code inspections"; The Journal of Systems and Software Science Direct; Feb. 28, 2004.*
Alsup, Lance A., et al., Patent Application entitled, "Project Estimator", filed Jul. 21, 2006, U.S. Appl. No. 11/491,203.
Cassone, Deandra T., et al., Patent Application entitled, "Enhanced Project Predictor", filed Feb. 8, 2007, U.S. Appl. No. 11/672,905.
Berenson, Mark L., et al., "Basic Business Statistics: Concepts and Applications," Upper Saddle River, N.J., Pearson/Prentice Hall, 2005, 8th Edition. pp. 550-633.

* cited by examiner

*Primary Examiner*—Tony Mahmoudi
*Assistant Examiner*—Dennis Truong

(57) ABSTRACT

A computer implemented system for project prediction is provided. The system includes a data manager to obtain historical project data. The system also includes an analyzer to analyze the historical project data to generate models for a proposed project cycle time. Additionally, the system includes a user interface to select one model for the proposed project cycle time, wherein the selected model includes linear sub-models corresponding to a historical data range, and apply proposed project data to one linear sub-model corresponding to a proposed data range to predict the proposed project cycle time. Furthermore, the system captures proposed project data and obtains additional project data to update the selected model. The models provide for the accurate prediction of cycle times, or project costs, in an enterprise development environment.

20 Claims, 7 Drawing Sheets

FIG. 3

Complexity Model

File  Edit  View  Insert  Format  Records  Tools  Window  Help     Type a question for help Complexity Model Input Screen

2/27/2006

Cycle Time Model Data Input

Add SR | Find SR | Save SR | Delete SR | Duplicate SR and Enter Data for New Point in Process | Predicted Cycle Time: 31.8 — 336
SR: [Project Title]    Complexity: Medium
CTL: [Director]    Point in Process: Actual 304 — 302 — Estimates and Inputs – Enter Estimates to Compute Complexity — 306 — 308

Grandfathered Project Yes-1,No-0: 0 | Business Project Yes-1,No-0: 1 | Major (1) or Minor/No Release (0): 1 | Business Unit: Consumer | Sponsoring Organization | Number of Application IDs: 17

Costs: — 310

| IT Internal Labor | 239000 | Network Internal Labor | 0 | Organizations (Enter 1 for Yes or 0 for No) — 312 |
| IT Vendor Labor | 10000 | IT Hardware | 0 | Boost | 0 | Legal | 0 |
| Network Vendor Labor | 0 | IT Software | 0 | Business Care | 0 | Marketing | 0 |
| Network Hardware | 0 | Other Project Cost | 0 | Business Development | 0 | Network | 0 |
| Network Software | 0 | IT Non-billable Labor | 0 | Business Marketing | 0 | Not Known | 0 |
| Handset Vendor Labor | 0 | Total Non-Dev Costs | 0 | Business Sales | 0 | Other | 0 |
| Handset Software | 0 | Total Project Costs | 249000 | 320 — Consumer Care | 1 | PRG PDU | 0 |
| Total Development Cost | 249000 | — 318 | 322 — Consumer Marketing | 0 | Product Management | 0 |
| | | | Consumer Sales | 1 | Readiness | 1 |
| | | | Corporate | 0 | 324 — Receivables Management | 1 |
| | | | Corporate Security | 1 | 326 — CEBU | 0 |
| | | | 328 — EPMO Project Manageme | 0 | Strategic Partners | 0 |
| | | | Finance | 1 | Technology | 1 |
| | | | 330 — Information Management | 0 | UXD | 0 |
| | | | IT-Billing | 0 | Web Presence | 0 |
| | | | 332 — IT | 1 | Total | 7 — 334 |

Record: 3 of 167

PROJECT PREDICTOR

CROSS-REFERENCE TO RELATED APPLICATIONS

This application includes subject matter related to the following application, which is hereby incorporated by reference:

U.S. patent application Ser. No. 11/491,203, filed Jul. 21, 2006, entitled "Project Estimator," by Lance Alsup, et at.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A business enterprise may be pursuing many projects at any given time. The enterprise may eventually allocate a significant amount of resources to each project during the project's cycle time, the time from the start of the project to the time at the completion of the project. Accurately predicting both the amount of resources required for the project and the cycle time for the project enables the enterprise to plan the allocation of resources over the cycle time. However, the cycle time and the amount of resources required for any project may be difficult to accurately predict during the initial stages of the project due to the differing nature of each project.

SUMMARY

In one embodiment, a computer implemented method for project prediction is provided. Historical project data is obtained. The historical project data is analyzed to generate models for a proposed project cycle time. One model is selected for the proposed project cycle time, wherein the selected model includes linear sub-models corresponding to historical data ranges. Proposed project data is applied to one linear sub-model corresponding to a proposed data range to predict the proposed project cycle time. Additional project data is obtained to update the selected model.

In another embodiment a computer implemented system for project prediction is provided. The system includes a data manager to obtain historical project data. The system also includes an analyzer to analyze the historical project data to generate models for a proposed project cycle time. Additionally, the system includes a user interface to select one model for the proposed project cycle time, wherein the selected model includes linear sub-models corresponding to historical data ranges, and apply proposed project data to one linear sub-model corresponding to a proposed data range to predict the proposed project cycle time.

In yet another embodiment, a computer implemented method for project prediction is provided. Historical project data is obtained. The historical project data is analyzed to generate models for a proposed project cost. One model is selected for the proposed project cost, wherein the selected model includes linear sub-models corresponding to historical data ranges. Proposed project data is applied to one linear sub-model corresponding to a proposed data range to predict the proposed project cost. Additional project data is obtained to update the selected model.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 3 shows an illustrative user interface according to an embodiment of the present disclosure.

DETAILED DESCRIPTION

It should be understood at the outset that although implementations of various embodiments of the present disclosure is described below, the present system may be implemented using any number of techniques, whether currently known or in existence. The present disclosure should in no way be limited to the implementations, drawings, and techniques described below, but may be modified within the scope of the appended claims along with their full scope of equivalents.

Some embodiments of the present disclosure provide a project predictor to predict a cycle time for a proposed project, while other embodiments of the present disclosure provide a project predictor to predict a cost for a proposed project. The project predictor employs one or more predictive models that include linear sub-models corresponding to historical data ranges. For example, a predictive model may be divided into linear sub-models based on estimated project costs, with a linear sub-model corresponding to each range identified for estimated project costs. Predictive models for a project may be based on estimated costs for the project and organization participation in the project. For projects with estimated costs greater than a specified amount, the predictive models may also be based on the project size. For projects with estimated costs less than a specified amount, the predictive models may also be based on the number of applications affected by the project and the pre-existing project status. When a project is submitted for prediction, a corresponding linear sub-model is selected and applied to make the prediction. The use of multiple sub-models enables the predictor to identify and model the regions of divergent behavior for different project types. In some of the embodiments of the present disclosure, the predictor captures the data submitted for making predictions and uses it to refine the predictive models.

Figure 1:
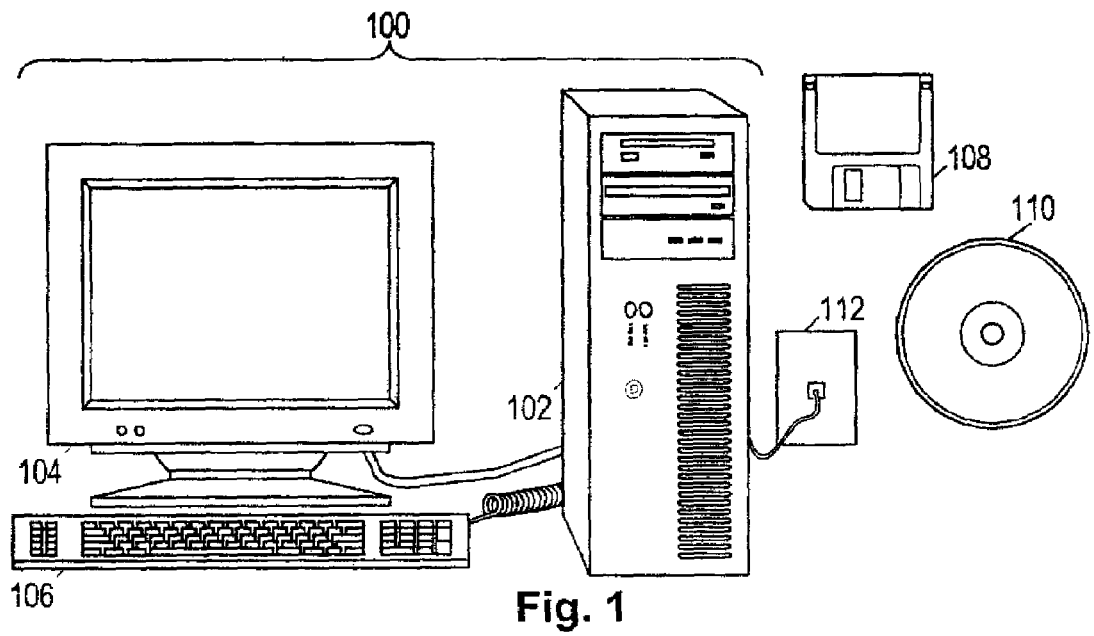
FIG. 1 shows an illustrative project predictor embodied as a desktop computer.

FIG. 1 shows an illustrative system 100 for a project predictor. The system 100 is shown as a desktop computer 100, although any electronic device having some amount of computing power coupled to a user interface may be configured to carry out the methods disclosed herein. Among, other things, servers, portable computers, personal digital assistants (PDAs) and mobile phones may be configured to carry out aspects of the disclosed methods.

As shown, the system 100 comprises a chassis 102, a display 104, and an input device 106. The chassis 102 comprises a processor, memory, and information storage devices. One or more of the information storage devices may store programs and data on removable storage media such as a floppy disk 108 or an optical disc 110. The chassis 102 may further comprise a network interface that allows the system 100 to receive information via a wired or wireless network, represented in FIG. 1 by a phone jack 112. The information storage media and information transport media (i.e., the networks) are collectively called "information carrier media."

The chassis 102 is coupled to the display 104 and the input device 106 to interact with a user. The display 104 and the input device 106 may together operate as a user interface. The display 104 is shown as a video monitor, but may take many alternative forms such as a printer, a speaker, or other means for communicating information to a user. The input device 106 is shown as a keyboard, but may similarly take many alternative forms such as a button, a mouse, a keypad, a dial, a motion sensor, a camera, a microphone or other means for receiving information from a user. Both the display 104 and the input device 106 may be integrated into the chassis 102.

Figure 2:
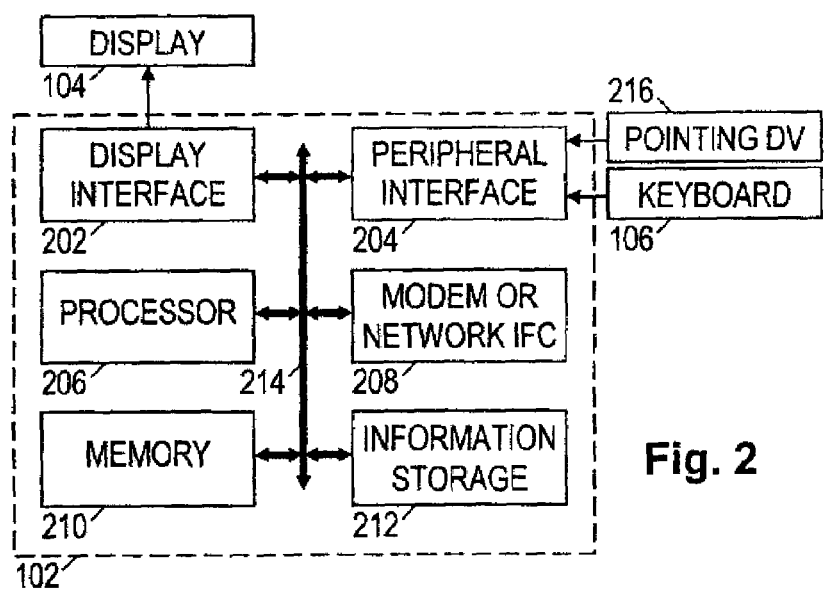
FIG. 2 shows a block diagram of an illustrative project predictor system.

FIG. 2 shows a simplified functional block diagram of the system 100. The chassis 102 may comprise a display interface 202, a peripheral interface 204, a processor 206, a modem or other suitable network interface 208, a memory 210, an information storage device 212, and a bus 214. The system 100 may be a bus-based computer, with the bus 214 interconnecting the other elements and carrying communications between them. The display interface 202 may take the form of a video card or other suitable display interface that accepts information from the bus 214 and transforms it into a form suitable for the display 104. Conversely, the peripheral interface 204 may accept signals from the keyboard 106 and other input devices such as a pointing device 216, and transform them into a form suitable for communication on the bus 214.

The processor 206 gathers information from other system elements, including input data from the peripheral interface 204, and program instructions and other data from the memory 210, the information storage device 212, or from a remote location via the network interface 208. The processor 206 carries out the program instructions and processes the data accordingly. The program instructions may further configure the processor 206 to send data to other system elements, comprising information for the user which may be communicated via the display interface 202 and the display 104.

The network interface 208 enables the processor 206 to communicate with remote systems via a network. The memory 210 may serve as a low-latency temporary store of information for the processor 206, and the information storage device 212 may serve as a long term (but higher latency) store of information.

The processor 206, and hence the desktop computer 100 as a whole, operates in accordance with one or more programs stored on the information storage device 212. The processor 206 may copy portions of the programs into the memory 210 for faster access, and may switch between programs or carry out additional programs in response to user actuation of the input device. The additional programs may be retrieved from the information storage device 212 or may be retrieved from remote locations via the network interface 208. One or more of these programs configures the system 100 to carry out at least one of the project predictor, methods disclosed herein.

Turning now to FIG. 3, an illustrative user interface 300 for a project predictor is depicted. The user interface 300 may include entry fields for a user to enter inputs 302 to predict either the cycle time or the cost for a proposed project, such as an enterprise software project. Alternatively, the user interface 300 may include entry fields for a user to enter similar information for a previous project. The inputs entry fields are shown for the purpose of an illustrative example only, as the user interface 300 may include any number of entry fields. The inputs 302 entry fields are selected based on a record of historical projects, which may include similar estimates and inputs for the historical projects along with the cycle times and the costs for historical projects. The information for the historical projects may be entered after those projects have been completed, but in some preferred embodiments, the information is entered before or during the project and supplemented after the project has been completed. The inputs 302 entry fields may include a grandfathered project 304 entry field, a major or minor 306 entry field, a number of applications 308 entry field, costs 310 entry fields, and organizations 312 entry fields. Information entered into any entry field may be a factor in estimating the cycle time or the cost for the proposed project.

The grandfathered project 304 entry field is for the user to enter a pre-existing project status to indicate whether a proposed project existed prior to a given date and hence was developed under different guidelines. The major or minor 306 entry field is for the user to enter the software release type typically dictated by the size of the project. The number of applications 308 entry field is for the user to enter an estimated number of applications that may be affected by the proposed project.

The costs 310 entry fields are displayed for the purpose of an illustrative example only, as the inputs 302 entry fields may include any number of costs 310 entry fields. For example, the costs 310 entry fields may include an information technology internal labor 314 entry field, an information technology vendor labor 316 entry field, and a total project costs 318 output. Continuing this example, the user may estimate the information technology internal labor 314 entry as $239,000 and may estimate the information technology vendor labor 316 entry as $10,000. Further to this example, the total project costs 318 output may display an estimated total project cost of $249,000. Furthermore, the inputs 302 entry fields, including initial estimated costs entries, may be factors in more accurately estimating a more accurate cost for the proposed project using embodiments of the present disclosure.

The organizations 312 entry fields are displayed for the purpose of an illustrative example only, as the inputs 302 entry fields may include any number of organizations 312 entry fields. For example, the organizations 312 entry fields may include a consumer care organization 320 entry field, a consumer sales organization 322 entry field, a receivables management organization 324 entry field, a subscriber business equipment unit organization 326 entry field, a finance organization 328 entry field, an information management organization 330 entry field, an information technology organization 332 entry field, and a total organizations 334 output. Continuing this example, each of these organizations listed may be organizations participating in the proposed project. Some embodiments of the present disclosure may estimate a more accurate cost for a proposed project, and allocate the estimated costs to the organizations participating in the proposed project.

If a user enters inputs 302 to predict the cycle time for a proposed project, the user interface 300 includes a predicted cycle time 336. Embodiments of the present disclosure generate the predicted cycle time 336 by applying the entered inputs 302 to a selected model based on historical project data. When the user enters inputs 302 to predict the cost for a proposed project, the user interface 300 may provide a predicted cost. Alternatively, the user may enter historical data for a previous project along with actual cost and cycle time information.

Figure 4:
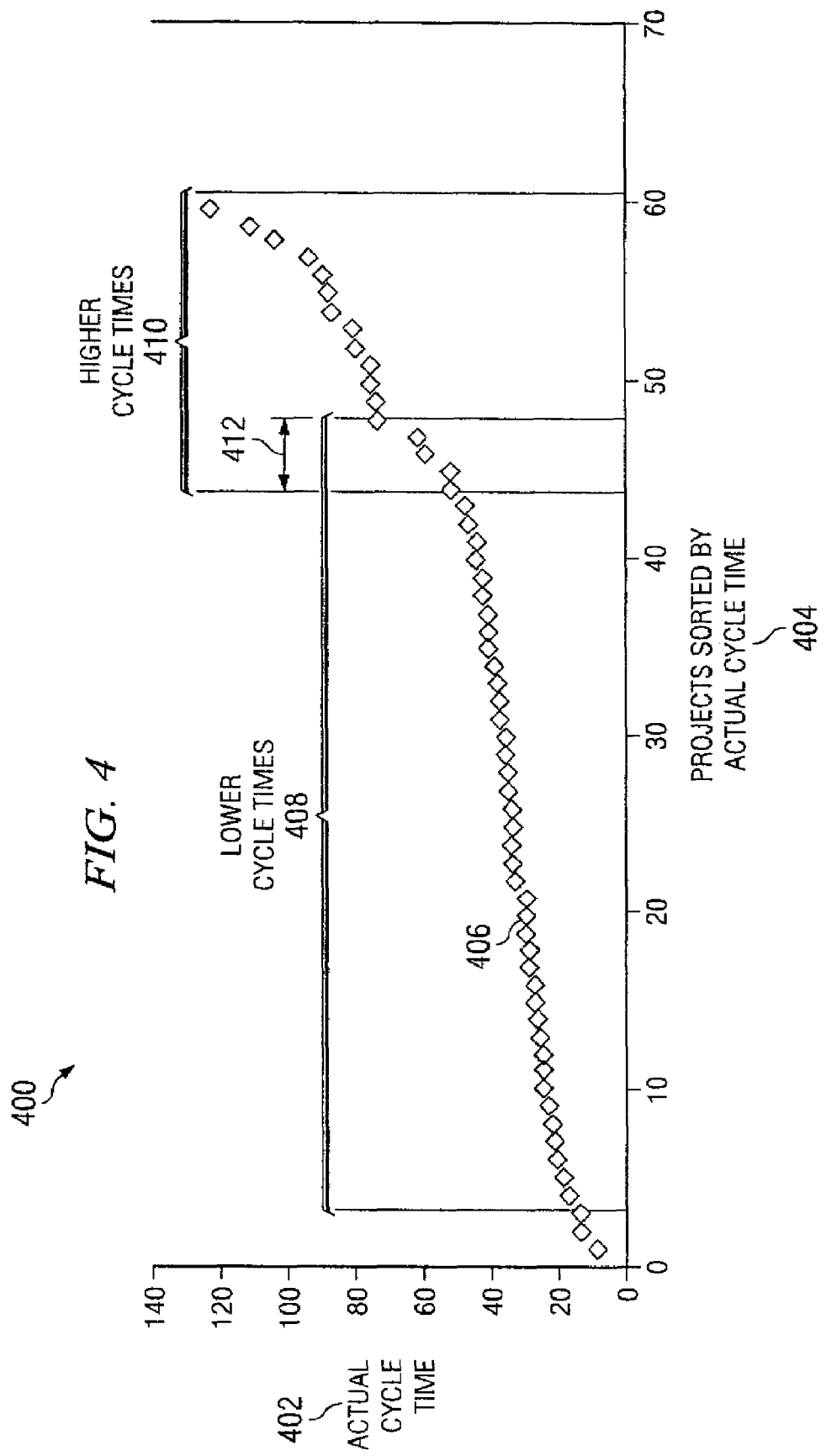
FIG. 4 shows an illustrative project data graph according to an embodiment of the present disclosure.

FIG. 4 shows an illustrative data graph 400 for projects according to an embodiment of the present disclosure. The data graph 400 depicts actual cycle time 402 for historical project data on the vertical axis and historical projects sorted by actual cycle time 404 on the horizontal axis. For example, when historical projects are sorted by actual cycle time from the historical project with the smallest actual cycle time to the historical project with the largest actual cycle time, a data point 406 may represent that the historical project with the $19^{th}$ smallest actual cycle time had an actual cycle time of 31 weeks.

The data graph 400 may depict that lower cycle times 408 increase gradually from historical project to historical project, in contrast to higher cycle times 410, which may increase sharply from historical project to historical project. The data graph 400 includes two contrasting ranges, lower cycle times 408 and higher cycle times 410, for the purpose of an example only, as the data graph 400 may include any number of contrasting ranges. The contrast between the lower cycle times 408 and the higher cycle times 410 may indicate a difference in the nature of the historical projects, which may be identified by measuring and comparing the average increase between actual cycle times for successive historical projects. The transition between historical projects with differing natures may be approximated as occurring at a transition data point 412. Research into characteristics of historical projects with the higher cycle times 410 may identify differences from characteristics of historical projects with the lower cycle times 408. The transition data point 412 may be based on an absolute value, such as the total project cost of one and a half million dollars, or relative values, such as 80% of the maximum estimate for the total project cost, or 10% greater than the median project cost. For example, the total project cost for almost all of the historical projects with the higher cycle times 410 may be greater than one and a half million dollars, whereas the total project cost for almost all of the historical projects with the lower cycle times 408 may be less than one and a half million dollars.

An identified difference in a characteristic between the historical projects with the higher cycle times 410 and the historical projects with the lower cycle times 408 may serve as the basis for generating sub-models divided at the transition data point 412 instead of generating a single model to approximate actual cycle time. For example, analysis of the projects may reveal that the projects above a specific transition data point generally have a total predicted project cost greater than a specified amount, and projects below the transition data point generally have a predicted total project cost less than the specified amount. As a specific example, the projects above transition data point 412 generally have a total predicted project cost greater than one and a half million dollars, and projects below transition data point 412 generally have a predicted total project cost less than one and a half million dollars. Hence different sub-models may be generated from the historical projects in these different regions.

Figure 5:
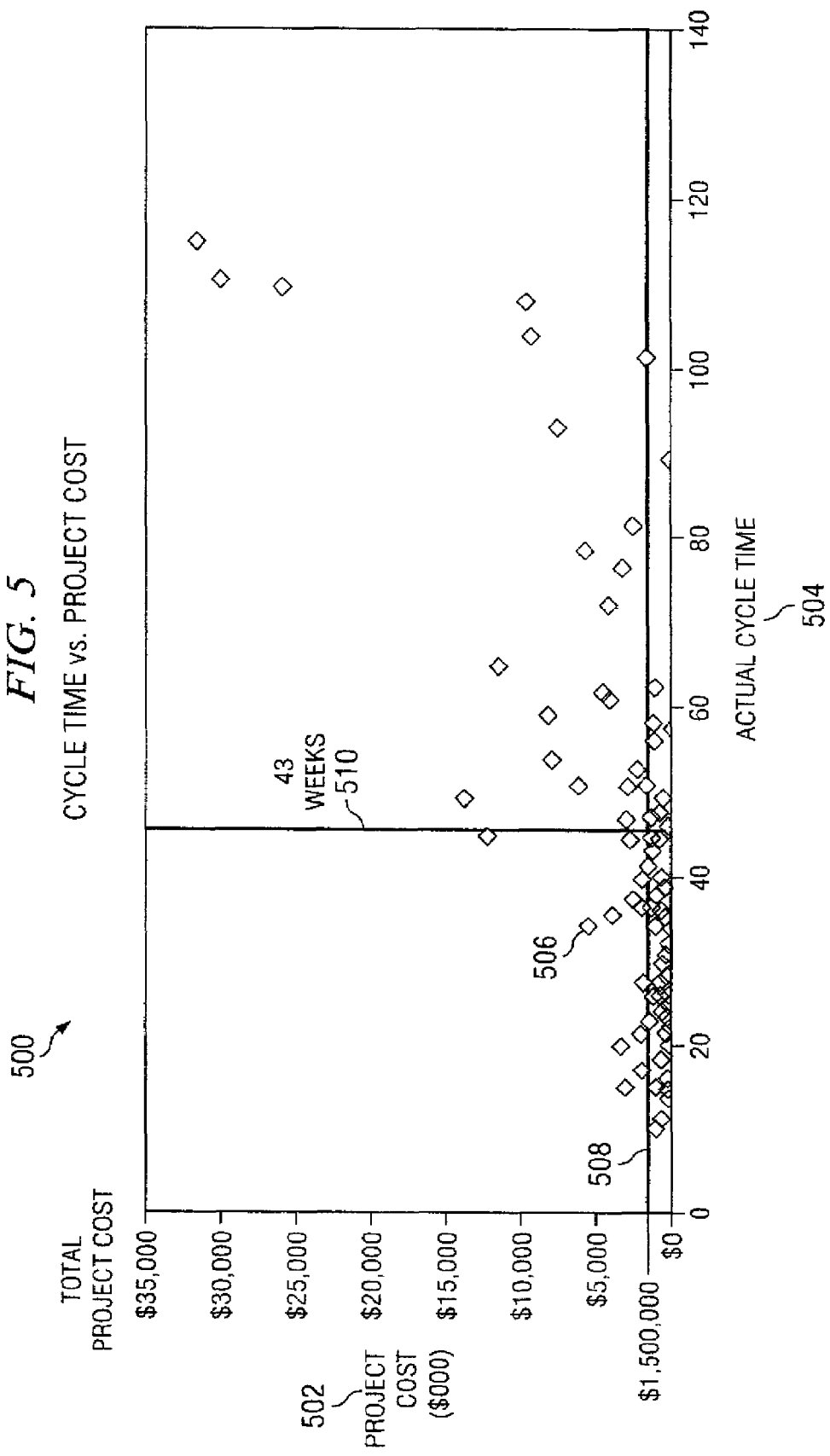
FIG. 5 shows an illustrative project predictor data graph according to an embodiment of the present disclosure.

FIG. 5 shows an illustrative data graph 500 for a project predictor according to an embodiment of the present disclosure. The data graph 500 depicts total project cost 502 for historical project data on the vertical axis and actual cycle time 504 for historical projects on the horizontal axis. For example, when historical projects are depicted by predicted total cost and actual cycle time, a data point 506 may represent that a historical project that had a predicted total cost of $5,200,000 required 36 weeks of actual cycle time to complete.

The vast majority of the projects graphed in the data graph 500 may have an actual cycle time 504 less than 60 weeks. The data graph 500 may depict that the vast majority of the historical projects with a total project cost greater than one and a half million dollars 508 may have higher cycle times than the average cycle time of 43 weeks 510, whereas the vast majority of the historical projects with a total project cost less than one and a half million dollars 508 may have lower cycle times than the average cycle time of 43 weeks 510.

Figure 6:
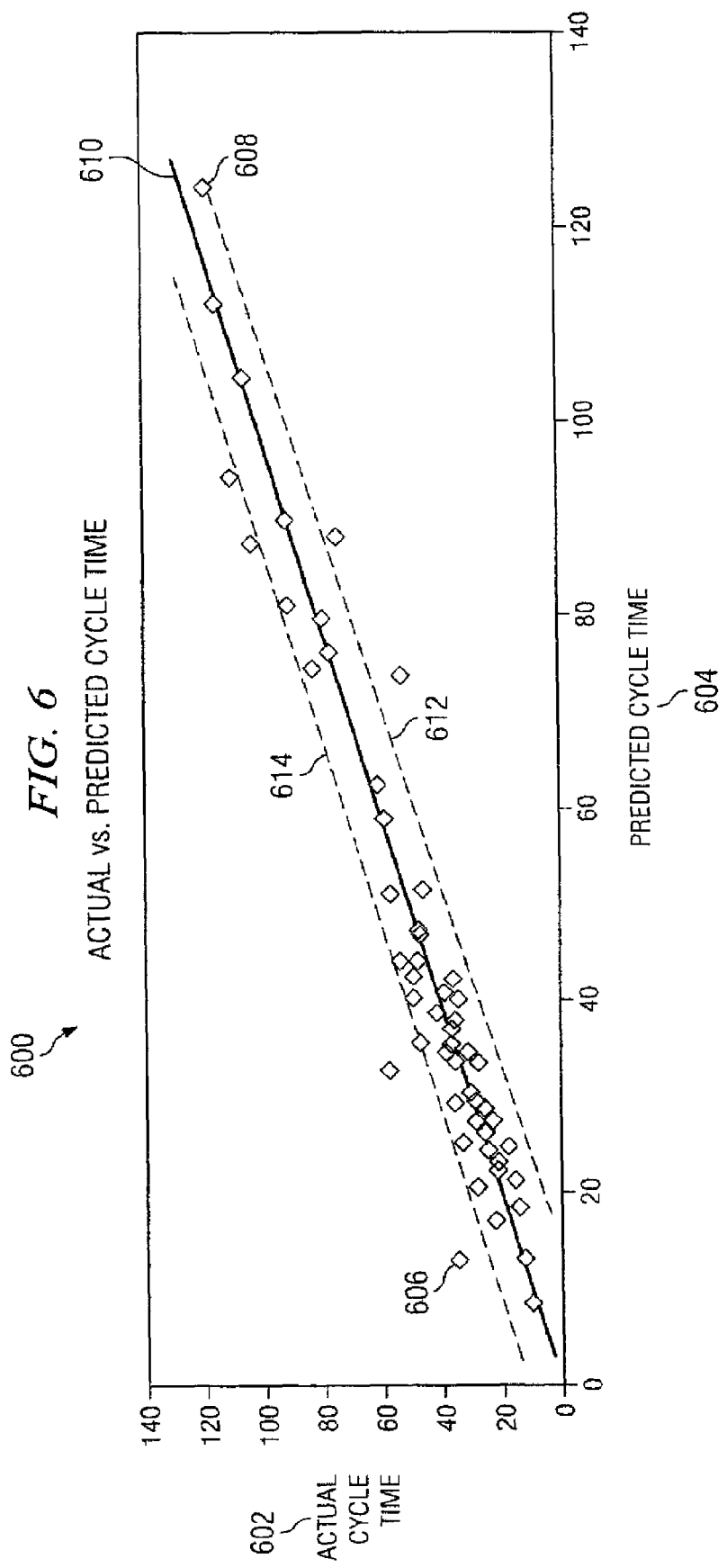
FIG. 6 shows an illustrative project predictor performance graph according to an embodiment of the present disclosure.

FIG. 6 shows an illustrative performance graph 600 for a project predictor according to an embodiment of the present disclosure. The data graph 600 depicts actual cycle time 602 for historical project data on the vertical axis and predicted cycle time 604 for historical project data on the horizontal axis. The data graph 600 provides a comparison of the predicted cycle time 604 and the actual cycle time 602 by depicting historical project data points corresponding to the actual cycle time 602 and the predicted cycle time 604, such as a first data point 606 and a second data point 608. The predicted cycle time 604 for each data point may be based on a linear sub-model. Additionally, the data graph 600 depicts a linear equation 610, which represents where the actual cycle time 602 matches the predicted cycle time 604 for every prediction instance with 100% accuracy.

Furthermore, the data % graph 600 depicts lines that are a specified amount of actual cycle time greater than the linear equation 610 and a specified, amount of actual cycle time less than the linear equation 610. For example, the first line 612 is equated to the line 610 minus eight weeks of actual cycle time, and the second line 614 is equated to the line 610 plus eight weeks of actual cycle time. The specified amount of actual cycle time may be eight weeks or any other time period. The region between the first line 612 and the second line 614 may be used to test the accuracy of the full prediction model for the project predictor by an empirical method. For example, the historical project data points, such as the second data point 608, that are between the first linear equation 612 and the second linear equation 614 represent where the actual cycle time 602 is within eight weeks of the predicted cycle time 604, represented by the linear equation 610. In another example, the historical project data points, such as the first data point 606, that are outside the first linear equation 612 and the second linear equation 614 represent where the actual cycle time 602 is outside eight weeks of the predicted cycle time 604, represented by the linear equation 610. The empirical method enables a user of the data graph 600 to evaluate whether the actual cycle time 602 for a sufficient number of historical data points are within a specified time range of the predicted cycle time 604. For example, the actual cycle time 602 for at least 90 percent of the historical data points in FIG. 6 are within eight weeks of the predicted cycle time 604, represented by the linear equation 610.

Figure 7:
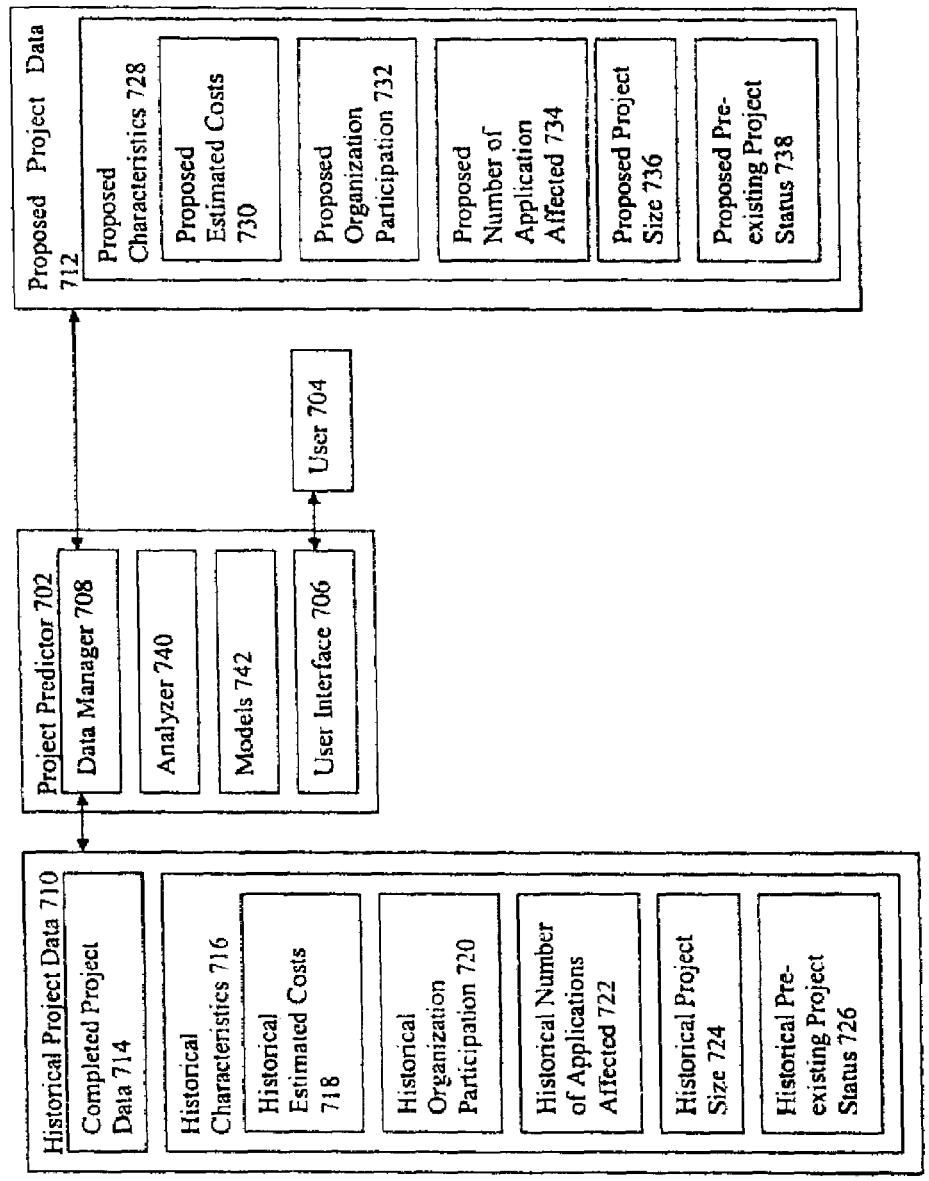
FIG. 7 shows illustrative software architecture for a project predictor according to an embodiment of the present disclosure.

FIG. 7 shows illustrative software architecture 700 for a project predictor 702 according to an embodiment of the present disclosure. The project predictor 702 interacts with a user 704 through a user interface 706. The project predictor 702 may include a data manager 708, which may either interact with or include databases of historical project data 710 and proposed project data 712. The data manager 708 may obtain the historical project data 710 and the proposed project data 712 or the user 704 may utilize the user interface 706 to enter the historical project data 710 and the proposed project data 712 into the data manager 708.

The historical project data 710 includes information for previous projects, such as completed project data 714, which may include the actual amount of time and cost required to complete each historical project, and other historical characteristics 716. The historical characteristics 716 may include historical estimated costs 718, historical organization participation 720, historical number of applications affected 722, historical project size 724, and historical pre-existing project status 726. Similarly, the proposed project data 712 may include proposed characteristics 728, which may include proposed estimated costs 730, proposed organization participation 732, proposed number of applications affected 734, proposed project size 736, and proposed preexisting project status 738. Characteristics of projects are discussed in more detail above in reference to FIG. 3, which depicts an example of the user interface 300 for entering examples of characteristics, such as the estimated costs 310, the organization participation 312, the number of applications 308, the major or minor project size 306, and the pre-existing project status 304.

The project predictor 702 may use an analyzer 740 to analyze the relationship between the completed project data 714 and the historical characteristics 716 to generate models 742 of the relationships between the completed project data 714 and the historical characteristics 716. If the user 704 is an administrator, the user 704 may configure the user interface 706 and sets up the models 742. If the user 704 is a manager, the user 704 may enter historical project data 710, utilize the user interface 706 to view performance graphs, select one model of the models 742, and apply the proposed characteristics 728 to the model to predict either a cycle time or a cost for a proposed project. Although depicted in FIG. 7 as separate components, any features and capabilities of the user interface 706, the data manager 708, the historical project data 710, the proposed project data 712, and the analyzer 740 may be combined or integrated in any combination.

Figure 8:
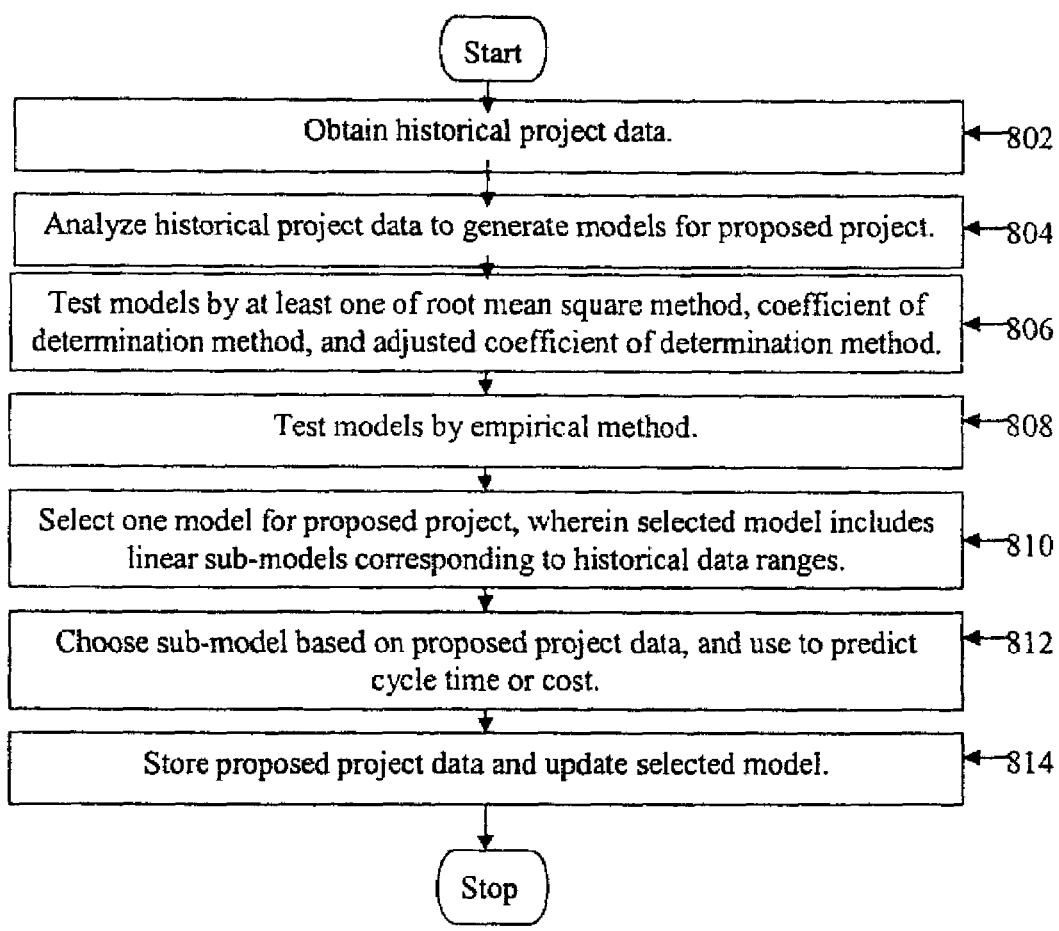
FIG. 8 shows an illustrative project predictor method according to an embodiment of the present disclosure.

FIG. 8 shows an illustrative project predictor method according to an embodiment of the present disclosure. Applying this method results in generating a model, which may comprise multiple linear sub-models, and predicting either a cycle time or a cost for a proposed project.

In box 802, historical project data is obtained. For example, the data manager 708 obtains the historical project data 710, which may include the historical characteristics 716 and the completed project data 714, which may include historical cycle times and historical costs.

In box 804, the historical project data is analyzed to generate models for a proposed project. For example, one way that the analyzer 740 may analyze the historical project data to generate models for a proposed project is by applying multiple regression analysis to the historical project data. Continuing this example, the analyzer 740 analyzes the relationships between the completed project data 714, which may be historical cycle times or historical costs, and the historical characteristics 716 to generate models for a proposed project by applying multiple regression analysis.

Details on multiple regression analysis can be found in Berenson, M. L., Krehbiel, T. C., and Levine, D. M., *Basic Business Statistics: Concepts and Applications*. Upper Saddle River, N.J., Pearson/Prentice Hall, 2005, 8$^{th}$ Edition. p. 550-633. HF1017.B38 2001. In statistics, regression analysis may be used to generate models for the relationships between variables, such as the completed project data 714 and the historical characteristics 716, determine the magnitude of the relationships between the variables for each model, and make predictions based on the models. Multiple regression analysis refers to analysis of a regression on more than two variables. Multiple regression analysis may begin with a set of all the potentially relevant variables and eliminate variables from the set of variables, based on a statistical significance test. The statistical significance test may analyze whether eliminating a specific variable resulted in a significant change in the predicted value for a model. This analysis may determine whether the specific variable is included or excluded from the model. The statistical significance test then repeats the analysis with a subset of the variables. The statistical significance test may also test the results of adding a previously excluded variable back into the set of variables used for the model.

Multiple regression analysis may include linear regression analysis, which assumes the best estimate is a model based on a linear function of some variables or a combination of linear sub-models based on linear functions of some variables. A linear function represents a straight line in Cartesian coordinates. If either a transition data point is identified for a model, such as the transition data point 412 in FIG. 4, or multiple transition data points are identified for a model, multiple regression analysis may result in the generation of multiple sub-models instead of the generation of a single model.

Multiple regression analysis may result in calculating a parameter value for each variable included in the model. Variables not included in the model have an implied parameter of zero. The predicted value for each data point in the model may be calculated by multiplying each variable for a data point by the corresponding parameter for the variable and then summing the products of each multiplication. A model may be based on an estimated total project cost 318 and the organizations 312 entry fields. For example, a model based on an estimation for the total project costs 318 that is greater than a specified cost may also be based upon the major or minor 306 entry field. The software release type dictated by the size of the project represented by the major or minor 306 entry field may further differentiate levels of complexity between the projects estimated to be more expensive. In contrast, a model based on an estimated total project cost 318 that is less than a specified cost may also be based upon the grandfathered project 304 entry field and the number of applications 308 entry field. The grandfathered project status and the number of applications affected may be factors that impact the projects estimated to be less expensive, but not the projects estimated to be more expensive. The magnitude of affect due to the grandfathered project status or the number of applications affected may be relatively minimal when compared to the cycle times and expenses for the projects estimated to be more expensive.

As a specific example of a model based on an estimated total project cost 318 that is less than a specified cost, a linear sub-model may be based on multiplying the following variables by their corresponding parameter values and summing the products. The grandfathered project 304 entry field is multiplied by 8.58652, the number of applications 308 entry field is multiplied by 0.17320, the total project costs 318 output is multiplied by 0.00001085, a network organization entry field is multiplied by 8.23761, the subscriber business equipment unit organization 326 entry field is multiplied by −10.43458, and all other variables are multiplied by 0.

In box 806, the models are tested by at least one of a root mean square error method, a coefficient of determination method, and an adjusted coefficient of determination method. The project predictor 702 may test the models 742 and any sub-models by at least one of these methods that are described in *Basic Business Statistics: Concepts and Applications*. The test for each of these methods and sub-models results in a numerical value for each model and sub-model. The resulting numerical value for each model and sub-model tested by a specific method may be compared to the corresponding numerical values for the other models and sub-models tested by the specific method to determine which model or sub-model is the most accurate model based on the specific method. The project predictor 702 may also test the models 742 by at least one of these methods while the analyzer 740 analyzes the historical project data to generate models and sub-models for a proposed project in box 804. Testing the models while the analyzer 740 generates models may enable the analyzer to stop generating models or sub-models when each specific method determines which generated model or sub-model is the most accurate model or sub-model based on each of the specific methods.

The root mean square error is the expected value of the square of the "error". The "error" is the amount by which the predicted value differs from the actual value. In an applied example, the root mean square error may be equal to 16.48 for one linear sub-model and equal to 12.32 for a linear sub-model measured to be more accurate by the root mean square error method.

The coefficient of determination is based on sample variance, the measure of a predicted value's statistical dispersion indicating how far from the actual value the predicted values typically are. The coefficient of determination is the proportion of the sample variance of the predicted values that are "explained" by predictor variables when a linear regression is done. Predictor variables may represent each of the data entered into the inputs 302. The coefficient of determination always increases when a new predictor variable is added to a model or sub-model, unless the new predictor variable is perfectly multi-colinear with the original predictor variables. Adding a new predictor variable to the model or sub-model will never decrease the coefficient of determination because the coefficient of determination values the considerations of an accurate model over the considerations of a complex model. When the coefficient of determination equals one or negative one, there is perfect and direct correlation between the predicted values and the actual values. When the coefficient of determination equals zero, there is no correlation between the predicted values and the actual values. In an applied example, the coefficient of determination may be equal to 0.79 for one linear sub-model and equal to 0.89 for a linear sub-model measured to be more accurate by the coefficient of determination method.

The adjusted coefficient of determination is a modification of the coefficient of determination that adjusts for the number of predictor variables in a model or sub-model. Unlike the coefficient of determination, the adjusted coefficient of determination increases only if a new predictor variable improves the model or sub-model more than would be expected by chance. In contrast to the coefficient of determination, the adjusted coefficient of determination values a simple model over a complex model, thus balancing the complexity of a model with the accuracy of the model. The adjusted coefficient of determination has the same value range, but will always be less than the coefficient of determination. In an applied example the adjusted coefficient of determination may be equal to 0.72 for one linear sub-model and equal to 0.85 for a linear sub-model measured to be more accurate by the adjusted coefficient of determination method.

In box 808, models are tested by an empirical method, which aggregates naturally occurring data. For example, the user 704 may utilize the user interface 706 to test the models 742, including sub-models; by using an empirical method. FIG. 6 depicts an example where the user 704 may test a sub-model by an empirical method, where the user of the data graph 600 evaluates whether the actual cycle time 602 for at least 90 percent of the historical data points are within eight weeks of the predicted cycle time 604, represented by the linear equation 610. Testing models and sub-models by the empirical method may serve as the basis for the user 704 to select one model or sub-model from the models 742 for the proposed project cycle in box 810.

In box 810, one model is selected for the proposed project cycle, wherein the selected model may include linear sub-models corresponding to historical data ranges. For example, the user 704 may utilize the user interface 706 to select one previously tested model from the models 742, which may correspond to a historical data range for projects estimated to cost less than or equal to a million and a half dollars. The model for the proposed project may be divided into two linear sub-models, with one data range for projects estimated to cost less than or equal to a million and a half dollars and another data range for projects estimated to cost more than a million and a half dollars. The division of the model into these sub-models may be based upon the identification of a transition data point, such as the transition data point 412 in FIG. 4. The division may be based on the premise that major projects differ from minor projects and based on an observation that multiple linear sub-models generate more accurate predictions than a single model generates for proposed project cycle times and costs.

In box 812, a sub-model is chosen based on the proposed project data, i.e., the linear sub-model corresponding to the data range of the proposed project, and used to predict the cycle time or cost. For example, the user 704 applies the proposed project data 712 entered into the inputs 302 entry fields to one linear sub-model of the models 742 to predict the cycle time or cost for the proposed project. The cycle time or cost for the proposed project may be calculated by multiplying each entry for the proposed project data 712 by the selected model's corresponding parameter for the entry and then summing the products of each multiplication. Continuing this example, the project predictor may predict the predicted cycle time 336 of 31.8 weeks, as depicted in FIG. 3.

In box 814, the proposed project data is stored and later used to update the selected model. For example, when the proposed project is completed, the proposed project data 712 and the actual cycle time and the actual cost for the proposed project are stored by the data manager 708 and used to update the historical project data 710 for use by a subsequent project. This updating of the historical project data 710, combined with the potential purging of the oldest historical project data 710, enables the project predictor 702 to generate the models 742 based on the most recent relationships between the historical characteristics 716 and the completed project data 714, such as the historical cycle times and the historical costs.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method for project prediction, comprising:
   obtaining historical project data of historical projects;
   analyzing, with an analyzer stored as a set of computer readable instructions on a computer readable storage media and executable by a processor, the historical project data to generate at least one model for predicting a proposed project cycle time, wherein the analyzing to generate the at least one model comprises:
      identifying at least one transition data point in the historical project data corresponding to a difference between actual cycle times for the historical projects that is indicative of a difference in the nature of the historical projects on either side of the at least one transition data point, wherein identifying the at least one transition data point comprises arranging projects in order based on actual cycle times for the historical projects, where the difference between actual cycle times for the historical projects corresponds to a transition data point where the actual cycle times transition from a first trend in the actual cycle times to a second trend in the actual cycle times;
      dividing the historical project data into historical data ranges, one historical data range approximately on either side of the at least one transition data point; and
      generating a linear sub-model for predicting project cycle time for each of the historical data ranges using multiple regression analysis on characteristics of the historical projects in the historical data range;
   selecting the at least one model for predicting the proposed project cycle time, wherein the selected model comprises the linear sub-models corresponding to the historical data ranges; and
   applying proposed project data to one of the linear sub-models to predict the proposed project cycle time, wherein a proposed data range of the proposed project corresponds with the historical data range corresponding with the one of the linear sub-models.

2. The computer implemented method of claim 1 wherein the proposed project data comprises proposed characteristics, wherein the historical project data comprises historical cycle times and historical characteristics significantly correlated with the historical cycle times, and wherein the proposed characteristics and the historical characteristics comprise at least one of estimated costs, organization participation, a number of applications effected, a project size, and a pre-existing project status.

3. The computer implemented method of claim 1 wherein selecting the at least one model for the proposed project cycle time comprises testing models generated by the analyzing of the historical project data by at least one of a root mean square error method, a coefficient of determination method, an adjusted coefficient of determination method, and an empirical method.

4. The computer implemented method of claim 1 wherein the proposed data range is based on an estimated total cost.

5. A computer implemented method for project prediction, comprising:
   obtaining historical project data of historical projects;
   analyzing the historical project data to generate at least one model for predicting a proposed project cycle time, wherein the analyzing to generate the at least one model comprises:
      identifying at least one transition data point in the historical project data corresponding to a difference between actual cycle times for the historical projects that is indicative of a difference in the nature of the historical projects on either side of the at least one transition data point;
      dividing the historical project data into historical data ranges, one historical data range approximately on either side of the at least one transition data point; and
      generating a linear sub-model for predicting project cycle time for each of the historical data ranges using multiple regression analysis on characteristics of the historical projects in the historical data range;
   selecting the at least one model for predicting the proposed project cycle time, wherein the selected model comprises the linear sub-models corresponding to the historical data ranges;
   applying proposed project data to one of the linear sub-models to predict the proposed project cycle time, wherein a proposed data range of the proposed project corresponds with the historical data range corresponding with the one of the linear sub-models; and
   updating the selected model using the proposed project data upon completing the proposed project;
   wherein the at least one transition data point is a specific estimated cost; and
   wherein the linear sub-model generated using multiple regression analysis for the historical data range that is greater than about the specific estimated cost based on characteristics of the historical projects including a project size and organization participation.

6. A computer implemented method for project prediction, comprising:
   obtaining historical project data of historical projects;
   analyzing the historical project data to generate at least one model for predicting a proposed project cycle time, wherein the analyzing to generate the at least one model comprises:
      identifying at least one transition data point in the historical project data corresponding to a difference between actual cycle times for the historical projects that is indicative of a difference in the nature of the historical projects on either side of the at least one transition data point;
      dividing the historical project data into historical data ranges, one historical data range approximately on either side of the at least one transition data point; and
      generating a linear sub-model for predicting project cycle time for each of the historical data ranges using multiple regression analysis on characteristics of the historical projects in the historical data range;

selecting the at least one model for predicting the proposed project cycle time, wherein the selected model comprises the linear sub-models corresponding to the historical data ranges;

applying proposed project data to one of the linear sub-models to predict the proposed project cycle time, wherein a proposed data range of the proposed project corresponds with the historical data range corresponding with the one of the linear sub-models; and updating the selected model using the proposed project data upon completing the proposed project;

wherein the at least one transition data point is a specific estimated cost; and wherein the linear sub-model generated using multiple regression analysis for the historical data range that is less than about the specific estimated cost based on characteristics of the historical projects including a number of applications affected and a pre-existing project status.

7. A computer implemented system for project prediction, comprising:

a data manager stored on a computer readable storage medium, which when executed by a processor obtains historical project data;

an analyzer stored on a computer readable storage medium, which when executed by a processor analyzes the historical project data to generate at least one model for predicting a proposed project cycle time, wherein the analysis to generate the at least one model comprises:

identifying at least one transition data point in the historical project data corresponding to a difference between actual cycle times for the historical projects that is indicative of a difference in the nature of the historical projects on either side of the at least one transition data point wherein the transition data point is based on a cost threshold;

dividing the historical project data into historical data ranges, one historical data range approximately on either side of the at least one transition data point; and generating a linear sub-model for predicting project cycle time for each of the historical data ranges using multiple regression analysis on characteristics of the historical projects in the historical data range; and a user interface stored on a computer readable storage medium, which when executed by a processor:

selects the at least one model for predicting the proposed project cycle time, wherein the selected model comprises the linear sub-models corresponding to the historical data ranges, and applies proposed project data to one of the linear sub-models to predict the proposed project cycle time, wherein a proposed data range of the proposed project corresponds with the historical data range corresponding with the one of the linear sub-models.

8. The computer implemented system of claim 7 wherein the proposed project data comprises proposed characteristics, and wherein the historical project data comprises historical cycle times and historical characteristics significantly correlated with the historical cycle times, and wherein the proposed characteristics and the historical characteristics comprise at least one of estimated costs, organization participation, a number of applications affected, a project size, and a pre-existing project status.

9. The computer implemented system of claim 7 wherein the user interface is further operable to test models generated by the analysis of the historical project data by at least one of a root mean square error method, a coefficient of determination method, an adjusted coefficient of determination method, and an empirical method.

10. A computer implemented method for project prediction, comprising:

obtaining historical project data of historical projects;

analyzing with an analyzer stored as a set of computer readable instructions on a computer readable storage media and executable by a processor the historical project data to generate at least one model for predicting a proposed project cost, wherein the analyzing to generate the at least one model comprises:

identifying at least one transition data point in the historical project data corresponding to a difference between actual project cost for the historical projects that is indicative of a difference in the nature of the historical projects on either side of the at least one transition data point, wherein identifying the at least one transition data point comprises arranging projects in order based on actual cycle times for the historical projects, where the difference between actual cycle times for the historical projects corresponds to a transition data point where the actual cycle times transition from a first trend in the actual cycle times to a second trend in the actual cycle times;

dividing the historical project data into historical data ranges, one historical data range approximately on either side of the at least one transition data point; and generating a linear sub-model for predicting project cycle time for each of the historical data ranges using multiple regression analysis on characteristics of the historical projects in the historical data range;

selecting the at least one model for predicting the proposed project cost, wherein the selected model comprises the linear sub-models corresponding to the historical data ranges;

applying proposed project data to one of the linear sub-models to predict the proposed project cost, wherein a proposed data range of the proposed project corresponds with the historical data range corresponding with the one of the linear sub-models; and updating the selected model using the proposed project data upon completing the proposed project.

11. The computer implemented method of claim 10 wherein the proposed project data comprises proposed characteristics, and wherein the historical project data comprises historical costs and historical characteristics significantly correlated with the historical costs.

12. The computer implemented method of claim 10 wherein the proposed characteristics and the historical characteristics comprise at least one of estimated costs, organization participation, a number of applications affected, a project size, and a pre-existing project status.

13. The computer implemented method of claim 7 wherein selecting the at least one model for the proposed project cost comprises testing models generated by the analyzing of the historical project data by at least one of a root mean square error method, a coefficient of determination method, and an adjusted coefficient of determination method, and an empirical method.

14. The computer implemented method of claim 1 wherein one of the linear sub-models generated using multiple regression analysis for one the historical data ranges on one side of the transition data point is based on a first set of characteristics of the historical projects, and the other of the linear sub-models generated using multiple regression analysis for the other of the historical data ranges on the other side of the transition data point is based on a second set of characteristics of the historical projects.

15. The computer implemented system of claim 7 wherein one of the linear sub-models generated using multiple regression analysis for one the historical data ranges on one side of the transition data point is based on a first set of characteristics of the historical projects, and the other of the linear sub-models generated using multiple regression analysis for the other of the historical data ranges on the other side of the transition data point is based on a second set of characteristics of the historical projects.

16. The computer implemented method of claim 10 wherein one of the linear sub-models generated using multiple regression analysis for one the historical data ranges on one side of the transition data point is based on a first set of characteristics of the historical projects, and the other of the linear sub-models generated using multiple regression analysis for the other of the historical data ranges on the other side of the transition data point is based on a second set of characteristics of the historical projects.

17. The computer implemented method of claim 1, wherein the point in the arranged historical projects where the actual cycle times transition from the first trend in the actual cycle times to the second trend in the actual cycle times is based on comparing an average change between actual cycle times for successive historical projects in the arranged historical projects.

18. The computer implemented method of claim 1, wherein identifying the at least one transition data point further comprises identifying at least one characteristic of the historical projects with values that when compared with the actual cycle times of the historical project about the transition cycle time are indicative of the difference in the nature of the historical projects.

19. The computer implemented method of claim 18, wherein the at least one transition data point is a value of the at least one characteristic when compared with the actual cycle times of the historical projects that corresponds with the transition cycle time.

20. The computer implemented method of claim 19, wherein the at least one characteristic is project cost.

* * * * *